United States Patent [19]

Isobe et al.

[11] Patent Number: 5,912,935
[45] Date of Patent: Jun. 15, 1999

[54] FUEL ROD FOR LIGHT WATER REACTOR AND METHOD FOR MANUFACTURING THE SAME

[75] Inventors: Takeshi Isobe; Yoshiharu Mae, both of Omiya; Toshimichi Takahashi, Hyogo-ken; Yoshitaka Suda, Tokai-mura; Akio Sando, Tokai-mura; Eiji Yoneda, Tokai-mura, all of Japan

[73] Assignees: Mitsubishi Materials Corporation; Mitsubishi Heavy Industries, Ltd.; Mitsubishi Nuclear Fuel Co., Ltd., all of Tokyo, Japan

[21] Appl. No.: 08/908,695

[22] Filed: Aug. 8, 1997

[30]    Foreign Application Priority Data

Aug. 9, 1996   [JP]   Japan ..................................... 8-211282

[51] Int. Cl.$^6$ .................................................. G21C 21/02
[52] U.S. Cl. .......................... 376/261; 376/451; 376/457; 420/422; 148/407; 428/660; 228/262.71; 219/137 WM
[58] Field of Search ..................................... 376/260, 261, 376/451, 457; 420/422; 148/407, 421, 672; 428/660; 228/262.71; 219/137 WM

[56]    References Cited

U.S. PATENT DOCUMENTS 4,649,023   3/1987   Sabol et al. ............................. 420/422

| | | |
|---|---|---|
| 4,921,663 | 5/1990 | Boatwright ............................... 376/451 |
| 4,938,920 | 7/1990 | Garzarolli et al. ....................... 376/457 |
| 5,112,573 | 5/1992 | Foster et al. ............................ 420/422 |
| 5,158,740 | 10/1992 | Boatwright ............................... 376/451 |
| 5,230,758 | 7/1993 | Foster et al. ............................ 420/422 |

FOREIGN PATENT DOCUMENTS 48-33858   10/1973   Japan .

OTHER PUBLICATIONS

English Abstract of JP 33828 (Oct. 1973).

*Primary Examiner*—Daniel D. Wasil
*Attorney, Agent, or Firm*—Oblon, Spivak, McClelland, Maier & Neustadt, P.C.

[57]    ABSTRACT

A fuel rod for a light water reactor comprises a cladding tube which comprises a zirconium alloy having a composition including 0.6 to 2.0% by weight of Nb, 0.5 to 1.5% by weight of Sn, 0.05 to 0.3% by weight of Fe, and the balance being Zr and incidental impurities; uranium oxide fuel pellets packed in the cladding tube; and end plugs closing both ends of the cladding tube. The cladding tube is sealed by TIG welding with the end plugs. Precipitates having grain diameters of 0.01 to 0.5 μm and comprise intermetallic compounds containing Zr, Nb and Fe are present at grain boundaries in the structure of heat affected zones of the cladding tube, the heat affected zone being adjacent to a bead formed by TIG welding.

23 Claims, 1 Drawing Sheet

FUEL ROD FOR LIGHT WATER REACTOR AND METHOD FOR MANUFACTURING THE SAME

BACKGROUND OF THE INVENTION

1. Field of the Invention

The present invention relates to a fuel rod for a light water reactor and a method for manufacturing the same.

2. Description of the Background

Recently, increasing importance has been given to nuclear power generation as a source of electrical power. In response, there has been an increased demand for the efficient operation of nuclear power plants. For nuclear power plants to operate efficiently, it is necessary to operate the light water reactors inside the plants efficiently. Improving the corrosion resistance of fuel rods would reduce the frequency of their replacement and improve the efficiency of the nuclear power plants.

A fuel rod comprise a zirconium cladding tube and $UO_2$ fuel packed inside. As is shown in the cross section FIG. 1, a fuel rod 1 for a light water reactor is constructed as follows: $UO_2$ fuel pellets 3 are packed one on top of another into a cladding tube 2 which comprises a zirconium alloy, such as Zircaloy-2 (JIS H4751ZrNT802D) or Zircaloy-4 (JIS H4751ZrNT804D). Both ends of the cladding tube 2 are then capped with end plugs 4 while the $UO_2$ fuel pellets 3 are pressed with a spring 5, and are sealed by TIG welding. Beads 6 formed at the welded portions by the TIG welding are approximately 2 mm in width, and heat affected zones 7, similarly having widths of approximately 2 mm, are formed on both side areas of each bead. When the TIG welded portions are allowed to cool as they are, the heat affected zones 7 are ordinarily considered to be cooled at a cooling rate of approximately 100° C./sec.

Before welding, the cladding tube 2 has a worked grain structure, while the end plugs 4 have equiaxed grain structures. The TIG welding changes the structure of the beads 6 and the heat affected zones 7. The beads 6 have a very fine acicular grain structure, which results from rapid cooling from the liquid phase. On the other hand, the heat affected zones 7 have a combined grain structure, of equiaxed grain structure 8 and acicular grain structure 9, as shown in FIG. 2, which results from rapid cooling from the β (b.c.c.) phase or from a temperature within a range where α and β phases coexists. The β (b.c.c.) phase is a zirconium phase stable at high temperature.

Sufficient corrosion resistance for long periods is not achieved in fuel rods which use a cladding made of conventional Zircaloy-2 or Zircaloy-4. A more corrosion resistant zirconium alloy, as compared with conventional Zircaloy-2 or Zircaloy-4, has a composition which includes 0.6 to 2.0% by weight of Nb, 0.5 to 1.5% by weight of Sn, 0.05 to 0.3% by weight of Fe, and the balance being Zr and incidental impurities (hereinafter, this zirconium alloy will be referred to as a zirconium alloy containing Nb and Fe) (cf. Japanese Unexamined Patent Publications No. 61-170552, No. 1-188643, No. 2-4937, and No. 3-90527, Japanese Examined Patent Publications No. 7-6018 and No. 7-6019, and others). When a cladding tube 2 comprising this zirconium alloy containing Nb and Fe is used, the heat affected zones 7, obtained by allowing the TIG welded portions to cool, have grain structures as shown in FIG. 2. The Nb and Fe segregate at grain boundaries 10 between an equiaxed grain structure 8 and an equiaxed grain structure 8, between an equiaxed grain structure 8 and an acicular grain structure 9, and between an acicular grain structure 9 and an acicular grain structure 9. The concentrations of Nb and Fe at these boundaries are at most 3.5% and 0.6% by weight, respectively. The presence of intermetallic compounds containing Zr, Nb and Fe at the grain boundaries in the heat affected zones, however, was previously not known. Even if intermetallic compounds were present, their presence could not be confirmed since such intermetallic compounds would have had very fine grains with diameters below 0.01 μm.

In general, fuel rods made from cladding tubes comprising the aforementioned zirconium alloy containing Nb and Fe, charged with $UO_2$ fuel, have improved corrosion resistance when compared to cladding tubes comprising conventional Zircaloy-2 or Zircaloy-4. In some cases, however, the heat affected zone of these tubes have inferior corrosion resistance as compared to cladding tubes comprising Zircaloy-2 or Zircaloy-4.

The rate of corrosion of a fuel rod in a nuclear reactor may be evaluated outside the reactor by, for example, an autoclave test, which is performed at a temperature of 360° C. under saturated water vapor pressure, i.e. approximately 190 atm. A sample fuel rod was constructed using a cladding tube comprising the aforementioned zirconium alloy containing Nb and Fe, the cladding tube was sealed with end plugs comprising Zircaloy-4 by TIG welding, and the sample was subjected to an autoclave test for 120 days under the above-described conditions. It was revealed that the bead portions due to welding and the heat affected zones of the end plugs, were covered with a black oxide film similar to the non-welded portions. The portions covered with this black oxide film had satisfactory corrosion resistance. A white oxide film was formed on the heat affected zones of the cladding tube comprising the zirconium alloy containing Nb and Fe. The portions where this white oxide film was formed had extremely low corrosion resistance. The reduction in corrosion resistance caused by formation of this white oxide film on the heat affected zones of the cladding tube having a thin wall leads to an extreme reduction in the life span of a fuel rod for a light water reactor.

SUMMARY OF THE INVENTION

The present inventors conducted a study on the white oxide film formed on heat affected portions of a cladding tube comprising a zirconium alloy containing Nb and Fe, and discovered the following. In a fuel rod obtained by TIG welding a cladding tube comprising a zirconium alloy containing Nb and Fe with end plugs, when the heat affected zones formed on the cladding tube are heat-treated by being maintaining at 500° C. to 750° C. for 1 min. to 24 hours, precipitates are generated at grain boundaries in the heat affected zones formed on the cladding tube. The precipitates have grain diameters of 0.01 to 0.5 μm and comprise intermetallic compounds containing Zr, Nb and Fe (for example, $Zr_{0.5}Nb_{0.3}Fe_{0.2}$). In the heat affected zones of the cladding tube where these precipitates are present at the grain boundaries, a white oxide film is not generated and corrosion resistance is greatly improved. The present invention has been accomplished based on such findings.

The present invention includes a weld of a zirconium alloy rod, comprising a bead and a heat affected zone adjacent to said bead, wherein said heat affected zone comprises precipitates, at grain boundaries, having grain diameters of 0.01 to 0.5 μm, and said precipitates comprise an intermetallic compound containing Zr, Nb and Fe.

The present invention also includes a fuel rod, comprising a cladding tube, end caps, and the weld described above, connecting said cladding tube and said end caps.

The present invention also includes a method of enhancing the corrosion resistance of a weld, comprising heat-treating a heat affected zone of a weld, by maintaining said heat affected zone at a temperature of 500 to 750° C. for at least one minute, wherein said heat affected zone has been prepared by welding a cladding tube and an end plug together, wherein said cladding tube comprises 0.6 to 2.0% by weight of Nb, 0.5 to 1.5% by weight of Sn, 0.05 to 0.3% by weight of Fe, and Zr and incidental impurities.

The present invention also includes a method of making a fuel rod, comprising sealing by welding a cladding tube and end plugs, thereby forming beads and heat affected zones adjacent to said beads; and heat-treating said heat affected zones by maintaining at a temperature of 500–750° C. for at least one minute, wherein said cladding tube comprises 0.6 to 2.0% by weight of Nb, 0.5 to 1.5% by weight of Sn, 0.05 to 0.3% by weight of Fe, and Zr and incidental impurities. Finally, the present invention also includes generating heat by fissioning a nuclear fuel in the fuel rod of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

The Figures use the following reference numbers.

Figure 1:
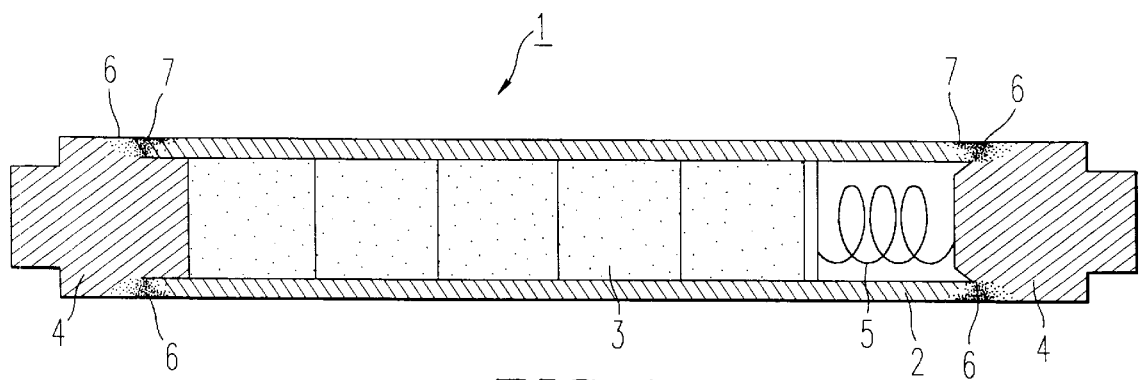
FIG. 1 shows a diagram for illustrating the structure of a fuel rod for a light water reactor.
Figure 2:
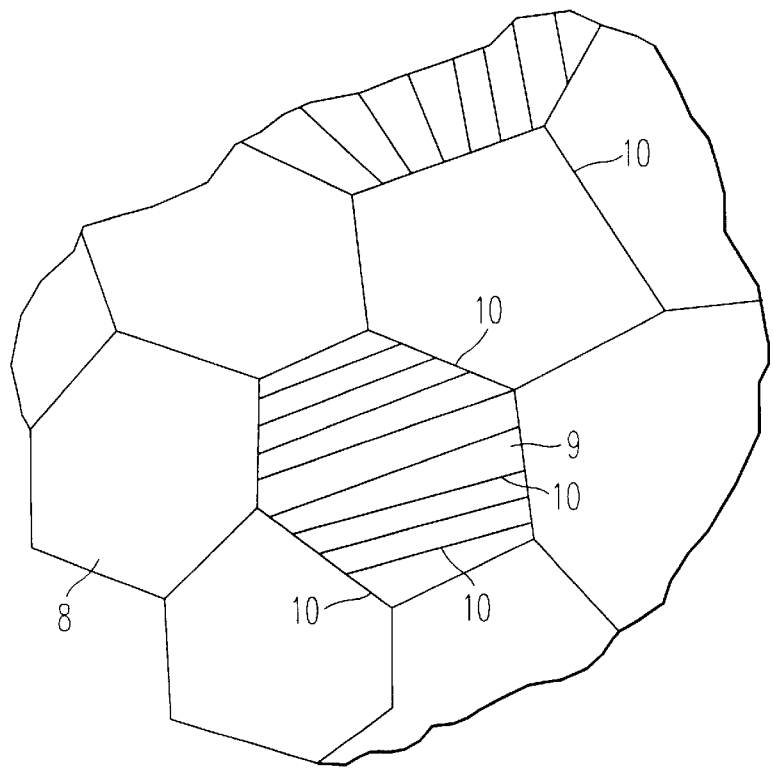
FIG. 2 shows a diagram for illustrating grain boundaries in the structure of a heat affected zone formed by TIG welding a cladding tube which comprises a zirconium alloy containing Nb and Fe.

1 fuel rod
2 cladding tube
3 $UO_2$ fuel pellet
4 end plug
5 spring
6 bead
7 heat affected zone
8 equiaxed structure
9 acicular structure
10 grain boundary

DETAILED DESCRIPTION OF THE INVENTION

The present invention may provide (1) a fuel rod for a light water reactor comprising a cladding tube which comprises a zirconium alloy containing Nb and Fe; uranium oxide fuel pellets packed in said cladding tube; and end plugs closing both ends of said cladding tube, said cladding tube being sealed by TIG welding with said end plugs, wherein precipitates which have grain diameters of 0.01 to 0.5 $\mu$m and comprise an intermetallic compound containing Zr, Nb and Fe are present at grain boundaries in the structure of each heat affected zone of said cladding tube, said heat affected zone being adjacent to a bead formed by TIG welding said cladding tube comprising said zirconium alloy containing Nb and Fe with said end plug.

The present invention may also provide (2) a method for manufacturing a fuel rod for a light water reactor, comprising:

packing uranium oxide fuel pellets into a cladding tube which comprises a zirconium alloy containing Nb and Fe;

capping both ends of said cladding tube with end plugs comprising a zirconium alloy; and sealing by TIG welding said cladding tube together with said end plugs, wherein:

each heat affected zone of said cladding tube which is adjacent to a bead formed by TIG welding said cladding tube with said end plug is heat-treated by maintaining at 500° C. to 750° C. for 1 min. to 24 hours.

According to the present invention, the zirconium alloy containing Nb and Fe used for the cladding tube of the fuel rod for a light water reactor has a composition including 0.6 to 2.0% by weight of Nb, 0.5 to 1.5% by weight of Sn, 0.05 to 0.3% by weight of Fe, and the balance being Zr and incidental impurities. Preferably, the zirconium alloy has a composition including 0.8 to 1.2% by weight of Nb, 0.8 to 1.1% by weight of Sn, 0.08 to 0.12% by weight of Fe, and the balance being Zr and incidental impurities.

A fuel rod for a light water reactor according to the present invention, comprises a cladding tube which comprises a zirconium alloy containing Nb and Fe; uranium oxide fuel pellets packed in the cladding tube; and end plugs closing both ends of the cladding tube, where the cladding tube is sealed with the end plugs by TIG welding. When Cr is present in the zirconium alloy as an incidental impurity, a trace amount of Cr may also be detected in precipitates which are present at the grain boundaries in the structures of heat affected zones.

In the fuel rod for a light water reactor according to the present invention, the precipitates present at grain boundaries in the heat affected zones due to welding, having grain diameters of 0.01 to 0.5 $\mu$m, and comprising intermetallic compounds containing Zr, Nb and Fe may be obtained by, in an inert gas atmosphere: (i) performing induction heating or heating by direct heating with electricity; or (ii) performing indirect heating in a resistant heating furnace. Specifically, the heat-treatment may be performed by holding the weld within a temperature range of 500° C. to 750° C. for a time range of 1 min. to 24 hours. When a higher temperature is employed, a shorter holding time should be employed. In contrast, when a lower temperature is employed, a longer holding time should be employed.

When the grain diameters of the precipitates present at the grain boundaries in the affected zone, due to welding and comprising intermetallic compounds containing Zr, Nb and Fe, are smaller than 0.01 $\mu$m, sufficient corrosion resistance cannot be achieved. Meanwhile, precipitates having grain diameters exceeding 0.5 $\mu$m are not generated under ordinary conditions. Further, with holding at a temperature below 500° C. for a reasonable time period, the grain diameters of the precipitates comprising intermetallic compounds do not reach 0.01 $\mu$m. On the other hand, with heat-treatment at a temperature above 750° C., corrosion resistance also deteriorates. In this case, growth of the precipitates is promoted, but the number of precipitates rapidly decreases, which may be attributed to re-dissolution.

Moreover, with a heat treatment time of less than 1 min., the grain diameters of the precipitates comprising intermetallic compounds do not reach 0.01 μm even if the temperature is set at the maximum temperature 750° C. On the other hand, with a heat-treating time period of over 24 hours, further precipitate growth and a further improvement in corrosion resistance is not achieved, since such factors have reached a plateau. Therefore, holding times of more than 24 hours provide no special benefits, nor cause any problems and accordingly holding times of at least 1 min., at a temperature of 500–750° C. are acceptable.

EXAMPLES

Example 1

Zirconium alloy cladding samples were prepared which had dimensions of 10 mm in diameter and 0.6 mm in thickness, having a composition including 1.0% by weight of Nb, 1.0% by weight of Sn, 0.1% by weight of Fe, and the balance Zr and incidental impurities. Each zirconium alloy cladding sample was TIG welded under the conditions described below at its ends with zirconium alloy end plugs which had a composition including 1.5% by weight of Sn, 0.2% by weight of Fe, 0.1% by weight of Cr, and the balance being Zr and incidental impurities. Heat affected zones of each cladding sample were heat-treated under the conditions shown in Table 1 to generate at grain boundaries precipitates comprising intermetallic compounds containing Zr, Nb and Fe. As a result, Samples 1 to 15 according to the present invention, Comparative Samples 1 to 5, and Conventional Sample 1 were manufactured.

TIG Welding Conditions:
Current: 30 A
Voltage: 15 V
Welding rate: 500 mm/min.
Cooling gas: 25 liter/min.He Samples 1 to 15 according to the present invention, Comparative Samples 1 to 3, and Conventional Sample 1 were subjected to chemical milling in a nitric-hydrofluoric acid solution [$HNO_3$:HF:$H_2O$=45:5:50 (% by volume)] to a thickness 100 μm, and were cut into disks having a diameter of 3 mm. Subsequently, the disks were subject to electrolytic milling under the conditions described below to prepare foil samples for examination by Transmission Electron Microscopy.

Electrolytic Milling Conditions:
Voltage: 20 V
Current: 100 mA
Temperature: –40° C.
Solution: 5% perchloric acid-methanol The above-obtained foil samples for examination by Transmission Electron Microscopy from Samples 1 to 15 according to the present invention, Comparative Samples 1 to 3, and Conventional Sample 1 were examined with an accelerating voltage of 200 kV and a magnification of 50,000 to measure the diameters of precipitates present at grain boundaries in the heat affected zones, which comprise intermetallic compounds containing Zr, Nb and Fe. The results are shown in Table 1.

Samples 1 to 15 according to the present invention, Comparative Samples 1 to 3, and Conventional Sample 1 were placed in an autoclave, and subject to autoclave tests under purified water having a high temperature of 360° C. for 120 days in order to examine color change in the heat affected zones of the zirconium alloy cladding samples. The results are shown in Table 1.

TABLE 1

| Sample Type & No. | | Heat-Treatment Conditions | | Grain Diameter of Precipitated Intermetallic Compound (μm) | Appearance after Autoclave Test (in 360° C. Pure Water for 120 Days) | Remarks |
|---|---|---|---|---|---|---|
| | | Temperature | Holding Time | | | |
| Samples of the Present Invention | 1 | 510° C. | 20 hr | 0.013 | Black | — |
| | 2 | 550° C. | 9 hr | 0.021 | Black | — |
| | 3 | 550° C. | 20 hr | 0.022 | Black | — |
| | 4 | 600° C. | 1 hr | 0.035 | Black | — |
| | 5 | 600° C. | 5 hr | 0.037 | Black | — |
| | 6 | 600° C. | 20 hr | 0.038 | Black | — |
| | 7 | 645° C. | 5 min | 0.018 | Black | — |
| | 8 | 645° C. | 0.5 hr | 0.045 | Black | — |
| | 9 | 645° C. | 5 hr | 0.051 | Black | — |
| | 10 | 645° C. | 20 hr | 0.052 | Black | — |
| | 11 | 695° C. | 1.5 min | 0.021 | Black | — |
| | 12 | 695° C. | 0.5 hr | 0.052 | Black | — |
| | 13 | 695° C. | 1 hr | 0.12 | Black | — |
| | 14 | 745° C. | 1.2 min | 0.024 | Black | — |
| | 15 | 745° C. | 10 min | 0.053 | Black | — |
| Comparative Samples | 1 | 450° C. | 20 hr | 0.005* | White (Peeled) | — |
| | 2 | 480° C. | 7 hr | 0.007* | Grayish White | — |
| | 3 | 745° C. | 0.5 min | 0.008* | Grayish White | — |
| Conventional Sample 1 | | — | — | —* | White (Peeled) | No Precipitates of 0.01 μm or larger in Diameter |

(The figures marked with "*" are out of the range specified according to the present invention.)

As shown in Table 1, heat affected zones of Conventional Sample 1, which were not heat-treated, changed white in color during the autoclave test and had inferior corrosion resistance. On the other hand, each heat affected zone of Samples 1 to 15 according to the present invention, in which the grain diameters of the precipitates generated in the heat affected zones and comprising intermetallic compounds containing Zr, Nb and Fe were within a range of 0.01 to 0.5 $\mu$m, had a black color after the autoclave test and had satisfactory corrosion resistance, while each of Comparative Samples 1 to 3, in which the grain diameters of the precipitates generated in the heat affected zones and comprising intermetallic compounds containing Zr, Nb and Fe were smaller than 0.01 $\mu$m, had a white color after the autoclave test and had low corrosion resistance.

As described above, the fuel rod for a light water reactor according to the present invention, the corrosion resistance of which is improved in comparison to conventional rods by heat-treatment at the heat affected zones due to welding, allows for highly efficient and highly reliable operation, and therefore, greatly contribute to the development of the atomic industry.

Obviously, numerous modifications and variations of the present invention are possible in light of the above teachings. It is therefore to be understood that within the scope of the appended claims, the invention may be practiced otherwise than as specifically described herein.

The priority document of the present application, Japanese Patent Application No. 08-211282, filed on Aug. 9, 1996, is hereby incorporated by reference.

What is claimed as new and is desired to be secured by Letters Patent of the United States is:

1. A weld of a zirconium alloy rod, comprising:
   a bead and a heat affected zone adjacent to said bead, wherein said heat affected zone comprises precipitates, at grain boundaries, having grain diameters of 0.01 to 0.5 $\mu$m, and said precipitates comprise an intermetallic compound containing Zr, Nb and Fe.

2. The weld of claim 1, wherein said intermetallic compound is $Zr_{0.5}Nb_{0.3}Fe_{0.2}$.

3. The weld of claim 1, wherein said weld comprises:
   0.6 to 2.0% by weight of Nb,
   0.5 to 1.5% by weight of Sn,
   0.05 to 0.3% by weight of Fe, and
   Zr and incidental impurities.

4. The weld of claim 1, wherein said weld comprises:
   0.8 to 1.2% by weight of Nb,
   0.8 to 1.1% by weight of Sn,
   0.08 to 0.12% by weight of Fe, and
   Zr and incidental impurities.

5. The weld of claim 3, wherein said weld consists essentially of Nb, Sn, Fe, Zr and incidental impurities.

6. The weld of claim 4, wherein said weld consists essentially of Nb, Sn, Fe, Zr and incidental impurities.

7. The weld of claim 6, further consisting essentially of Cr.

8. A fuel rod, comprising:
   a cladding tube,
   end caps, and
   the weld of claim 1, connecting said cladding tube and said end caps.

9. The fuel rod of claim 8, wherein said cladding tube comprises:
   0.6 to 2.0% by weight of Nb,
   0.5 to 1.5% by weight of Sn,
   0.05 to 0.3% by weight of Fe, and
   Zr and incidental impurities.

10. The fuel rod of claim 8, wherein said cladding tube comprises:
    0.8 to 1.2% by weight of Nb,
    0.8 to 1.1% by weight of Sn,
    0.08 to 0.12% by weight of Fe, and
    Zr and incidental impurities.

11. The fuel rod of claim 9, wherein said cladding tube consists essentially of Nb, Sn, Fe, Zr and incidental impurities.

12. The fuel rod of claim 10, wherein said cladding tube consists essentially of Nb, Sn, Fe, Zr and incidental impurities.

13. The fuel rod of claim 12, wherein said cladding further consists essentially of Cr.

14. A method of enhancing the corrosion resistance of a weld, comprising:
    heat-treating a heat affected zone of a weld, by maintaining said heat affected zone at a temperature of 500 to 750° C. for at least one minute, wherein said heat affected zone has been prepared by welding a cladding tube and an end plug together, wherein said cladding tube comprises 0.6 to 2.0% by weight of Nb, 0.5 to 1.5% by weight of Sn, 0.05 to 0.3% by weight of Fe, and Zr and incidental impurities.

15. The method of claim 14, wherein said cladding tube comprises 0.8 to 1.2% by weight of Nb, 0.8 to 1.1% by weight of Sn, 0.08 to 0.12% by weight of Fe, and Zr and incidental impurities.

16. The method of claim 14, wherein said cladding tube consists essentially of Nb, Sn, Fe, Zr and incidental impurities.

17. The method of claim 15, wherein said cladding tube consists essentially of Nb, Sn, Fe, Zr and incidental impurities.

18. The method of claim 16, wherein said cladding tube further consists essentially of Cr.

19. A method of making a fuel rod, comprising:
    sealing by welding a cladding tube and end plugs, thereby forming beads and heat affected zones adjacent to said beads; and
    heat-treating said heat affected zones by maintaining at a temperature of 500–750° C. for at least one minute,
    wherein said cladding tube comprises 0.6 to 2.0% by weight of Nb, 0.5 to 1.5% by weight of Sn, 0.05 to 0.3% by weight of Fe, and Zr and incidental impurities.

20. The method of claim 19, wherein said cladding tube comprises 0.8 to 1.2% by weight of Nb, 0.8 to 1.1% by weight of Sn, 0.08 to 0.12% by weight of Fe, and Zr and incidental impurities.

21. The product produced by the method of claim 14.

22. The product produced by the method of claim 19.

23. A method of generating electrical power, comprising:
    generating heat by fission of a nuclear fuel inside the fuel rod of claim 8.

* * * * *